United States Patent [19]

Matsuura et al.

[11] 4,396,534
[45] Aug. 2, 1983

[54] OLEFIN POLYMERIZING CATALYST

[75] Inventors: Kazuo Matsuura, Tokyo; Takeichi Shiraishi; Etsuo Kawamata, both of Kawasaki; Mitsuo Okamoto; Nobuyuki Kuroda, both of Yokohama; Mituji Miyoshi, Fujisawa, all of Japan

[73] Assignee: Nippon Oil Company, Limited, Tokyo, Japan

[21] Appl. No.: 360,662

[22] Filed: Mar. 22, 1982

[30] Foreign Application Priority Data

Mar. 25, 1981 [JP] Japan ................................ 56-42528

[51] Int. Cl.³ .............................................. C08F 4/64
[52] U.S. Cl. .................................. 252/429 B; 526/125
[58] Field of Search ..................................... 252/429 B

[56] References Cited

U.S. PATENT DOCUMENTS

| | | | |
|---|---|---|---|
| 3,271,376 | 9/1966 | Achon et al. | 252/429 B X |
| 3,897,407 | 7/1975 | Shirai et al. | 252/429 B X |
| 4,105,847 | 8/1978 | Ito et al. | 252/429 B X |
| 4,223,118 | 9/1980 | Tsubaki et al. | 252/429 B X |

*Primary Examiner*—Patrick Garvin
*Attorney, Agent, or Firm*—Stevens, Davis, Miller & Mosher

[57] ABSTRACT

In an olefin polymerizing catalyst comprising a solid catalyst component and an organometallic compound, there is used, as the solid catalyst component, a substance obtained by contacting and reacting the following compounds with one another:

(1) a silicon oxide and/or an aluminum oxide,
(2) a magnesium halide,
(3) a compound represented by the general formula $Me(OR)_nX_{z-n}$ wherein Me is an element belonging to Groups I through IV in the Periodic Table, z is the valence of the element Me, n is $0 < n \leq z$, X is a halogen atom and R is a hydrocarbon radical having 1 to 20 carbon atoms,
(4) a titanium compound and/or a vanadium compound, and
(5) a compound represented by the general formula $R''_n Si(OR')_m X_{4-m-n}$ wherein R' and R'' are each a hydrocarbon radical having 1 to 24 carbon atoms, X is a halogen atom, n is $0 \leq n < 4$ and m is $0 < m \leq 4$, with the limitation that $0 < m+n \leq 4$, and/or a polysiloxane.

10 Claims, No Drawings

OLEFIN POLYMERIZING CATALYST

BACKGROUND OF THE INVENTION

The present invention relates to a novel catalyst for the polymerization of olefins.

Heretofore, in the technical field of this sort there have been known various catalysts comprising inorganic magnesium solids as carriers such as magnesium halides, magnesium oxide and magnesium hydroxide, and transition metal compounds supported thereon such as titanium compounds and vanadium compounds. However, if olefins are polymerized using these known catalysts, the bulk density of the resulting polymer is generally low, the average particle size is relatively small and the particle size distribution is generally wide, allowing a particulate portion to occupy a fairly large portion, thus causing a serious drawback in the aspects of productivity and handling. Moreover, when molding the resulting polymer, there arise problems such as the generation of dust and the decrease of efficiency in the molding operation. Therefore, it has been a keen desire to increase the bulk density and to decrease a fine particulate portion. Furthermore, for the application to a processing method wherein a pelletizing step is omitted and a powdered polymer is directly fed to a processing machine, a demand for which has recently been increasing, it is considered that further improvements are necessary.

It is an object of the present invention to remedy the above-mentioned drawbacks.

It is another object of the present invention to provide a novel polymerization catalyst which can afford olefin polymers having a high bulk density, a large average particle size, a narrow particle size distribution and a remarkably small proportion of a fine particulate portion.

Other objects and advantages of the present invention will become apparent from the following description.

SUMMARY OF THE INVENTION

The aforesaid objects of the present invention can be attained by using an olefin polymerizing catalyst which comprises a solid catalyst component and an organometallic compound, said solid catalyst component comprising a substance obtained by contacting and reacting the following compounds with one another:

(1) a silicon oxide and/or an aluminum oxide,
(2) a magnesium halide,
(3) a compound represented by the general formula $Me(OR)_nX_{z-n}$ wherein Me is an element belonging to I–IV Groups in the Periodic Table, z is the valence of the element Me, n is $0<n\leq z$, X is a halogen atom and R is a hydrocarbon radical having 1 to 24 carbon atoms,
(4) a titanium compound and/or a vanadium compound, and
(5) a compound represented by the general formula $R''_nSi(OR')_mX_{4-m-n}$ wherein R' and R'' are each a hydrocarbon radical having 1 to 24 carbon atoms, X is a halogen atom, n is $0\leq n<4$ and m is $0<m\leq 4$, with the limitation that $0<m+n\leq 4$, and/or a polysiloxane.

DETAILED DESCRIPTION OF THE INVENTION

The silicon oxide used in the present invention is silica or a double oxide of silicon and at least one other metal of Groups I–VIII in the Periodic Table.

The aluminum oxide used in the present invention is alumina or a double oxide of aluminum and at least one other metal of Groups I–VIII in the Periodic Table.

As the double oxide of silicon or aluminum and at least one other metal of Groups I–VIII in the Periodic Table there may be used various natural and synthetic double oxides, typical of which are $Al_2O_3.MgO$, $Al_2O_3.CaO$, $Al_2O_3.SiO_2$, $Al_2O_3.MgO.CaO$, $Al_2O_3.MgO.SiO_2$, $Al_2O_3.CuO$, $Al_2O_3.Fe_2O_3$, $Al_2O_3.NiO$, and $SiO_2.MgO$. These formulae are not molecular formulae, representing only compositions. The structure and components ratio of the double oxides which may be used in the present invention are not specially limited. As a matter of course, the silicon oxide and/or aluminum oxide used in the invention may adsorb a small amount of moisture and may contain small amounts of impurities.

As the magnesium halide used in the present invention there may be employed substantially anhydrous ones, for example, magnesium fluoride, magnesium chloride, magnesium bromide and magnesium iodide with magnesium chloride being particularly preferred.

In the present invention, these magnesium halides may have been treated with an electron donor such as an alcohol, an ester, a ketone, a carboxylic acid, an ether, an amine or a phosphine.

As the compound used in the invention represented by the general formula $Me(OR)_nX_{z-n}$ wherein Me is an element belonging to Groups I–IV in the Periodic Table such as Na, Mg, Ca, Zn, Cd, B or Al, z is the valence of the element Me, n is $0<n\leq z$, X is a halogen atom and R, which may be alike or different, represents a hydrocarbon radical having 1 to 20 carbon atoms such as an alkyl, aryl or aralkyl group, there may be employed various compounds, for example, those represented by the following formulae: $NaOR$, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$. More particularly, the following compounds are preferred. $Mg(OC_2H_5)_2$, $Mg(OC_2H_5)Cl$, $Al(OCH_3)_3$, $Al(OC_2H_5)_3$, $Al(On—C_3H_7)_3$, $Al(Oi—C_3H_7)_3$, $Al(On—C_4H_9)_3$, $Al(Osec—C_4H_9)_3$, $Al(Ot—C_4H_9)_3$, $Al(OCH_3)_2Cl$, $Al(OC_2H_5)_2Cl$, $Al(OC_2H_5)Cl_2$, $Al(Oi—C_3H_7)_2Cl$, $Al(Oi—C_3H_7)Cl_2$.

Examples of the titanium compound and/or vanadium compound used in the invention include halides, alkoxyhalides, alkoxides and halogenated oxides of titanium and/or vanadium. Preferred titanium compounds are tetravalent and trivalent titanium compounds, and preferred tetravalent titanium compounds are those represented by the general formula $Ti(OR)_nX_{4-n}$ wherein R is an alkyl, aryl or aralkyl group having 1 to 20 carbon atoms, X is a halogen atom and n is $0\leq n\leq 4$, examples of which are titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium.

Examples of trivalent titanium compounds include titanium trihalides obtained by reducing titanium tetrahalides such as titanium tetrachloride and titanium tetrabromide with hydrogen, aluminum, titanium or an organometallic compound of a metal of Groups I–III in the Periodic Table, as well as trivalent titanium compounds obtained by reducing tetravalent alkoxytitanium halides of the general formula $Ti(OR)_m X_{4-m}$ with an organometallic compound of a metal of Groups I–III in the Periodic Table, in which formula R is an alkyl, aryl or aralkyl group having 1 to 20 carbon atoms, X is a halogen atom and m is $0 < m < 4$. Examples of the vanadium compound are tetravalent vanadium compounds such as vanadium tetrachloride, vanadium tetrabromide, vanadium tetraiodide and tetraethoxyvanadium, pentavalent vanadium compounds such as vanadium oxytrichloride, ethoxydichlorovanadyl, triethoxyvanadyl and tributoxyvanadyl, and trivalent vanadium compounds such as vanadium trichloride and vanadium triethoxide.

To make the present invention more effective, both the titanium compound and the vanadium compound are often used together, and in this case the V/Ti mole ratio is preferably in the range of 2/1 to 0.01/1.

As the compound used in the present invention represented by the general formula $R''_n Si(OR')_m X_{4-m-n}$ wherein R' and R'' are each a hydrocarbon radical such as an alkyl, aryl or aralkyl group having 1 to 24 carbon atoms, X is a halogen atom, n is $0 \leq n < 4$, m is $0 < m \leq 4$, and n and m are in the relation of $0 < n+m \leq 4$, there may be employed, for example, monomethyltrimethoxysilane, monomethyltriethoxysilane, monomethyltri-n-butoxysilane, monomethyltri-sec-butoxysilane, monomethyltriisopropoxysilane, monomethyltripentoxysilane, monomethyltrioctoxysilane, monomethyltristearoxysilane, monomethyltriphenoxysilane, dimethyldimethoxysilane, dimethyldiethoxysilane, dimethyldiisopropoxysilane, dimethyldiphenoxysilane, trimethylmonomethoxysilane, trimethylmonoethoxysilane, trimethylmonoisopropoxysilane, trimethylmonophenoxysilane, monomethyldimethoxymonochlorosilane, monomethyldiethoxymonochlorosilane, monomethylmonoethoxydichlorosilane, monomethyldiethoxymonochlorosilane, monomethyldiethoxymonobromosilane, monomethyldiphenoxymonochlorosilane, dimethylmonoethoxymonochlorosilane, monoethyltrimethoxysilane, monoethyltriethoxysilane, monoethyltriisopropoxysilane, monoethyltriphenoxysilane, diethyldimethoxysilane, diethyldiethoxysilane, diethyldiphenoxysilane, triethylmonomethoxysilane, triethylmonoethoxysilane, triethylmonophenoxysilane, monoethyldimethoxymonochlorosilane, monoethyldiethoxymonochlorosilane, monoethyldiphenoxymonochlorosilane, monoisopropyltrimethoxysilane, mono-n-butyltrimethoxysilane, mono-n-butyltriethoxysilane, mono-sec-butyltriethoxysilane, monophenyltriethoxysilane, diphenyldiethoxysilane, diphenylmonoethoxymonochlorosilane, monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, and tetraisopropoxysilane.

Chainlike or cyclic polysiloxanes resulting from condensation of the above compounds, having recurring units represented

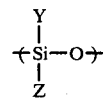

wherein Y and Z each represents R'', (OR') or halogen, are also employable in the present invention.

The compounds represented by the general formula $Si(OR')_m X_{4-m}$ are particularly preferred in the present invention.

The sequence and method for contacting and reacting the components (1) through (5) in the present invention are not specially limited, but preferably, first the components (1), (2), (3) and (4) are reacted and then the component (5) is reacted with the resulting product, or the component (4) is reacted with the reaction product of the components (1), (2), (3) and (5).

In the former method, that is, in case the component (5) is reacted with the reaction product of the components (1), (2), (3) and (4), the sequence and method of the reaction among the components (1), (2), (3) and (4) are not specially limited. For example, the reaction may be carried out in such a manner that the components (1) and (2) are contacted with each other, then the component (3) (or the component (4)) is contacted with the resulting product and thereafter the remaining one component is brought into contact. Preferably, the components (2) and (3) are reacted in advance and the reaction product thereby obtained is used as the components (2) and (3). More particularly, the silicon oxide and/or aluminum oxide (1), the reaction product (hereinafter referred to as the component (2-3)) of the magnesium halide (2) with the compound (3) of the general formula $Me(OR)_n X_{z-n}$ wherein Me is an element belonging to Groups I–IV in the Periodic Table, z is the valence of the element Me, n is $0 < n \leq z$, X is a halogen atom and R is a hydrocarbon radical having 1 to 20 carbon atoms, and the titanium compound and/or vanadium compound (4), are contacted and reacted with one another.

As to the sequence of the contact, the above contacting operation may be performed in such a manner that the component (1) and the component (2-3) are contacted with each other and then the component (4) is contacted with the resulting product, or first the components (1) and (4) are contacted with each other and then the component (2-3) is contacted with the resulting product, or first the component (2-3) and the component (4) are contacted with each other and then the component (1) is contacted with the resulting product. Preferably, the components (1) and (2-3) are contacted with each other and then the component (4) is contacted with the resulting product.

The contacting method is not specially limited, that is, known methods can be adopted. In the case of contacting the components (1) and (2-3) with each other, or in the case of contacting the component (2-3) with the contacted product of the components (1) and (4), or in the case of contacting the component (1) with the contacted product of the components (2-3) and (4), there may be applied a co-pulverization treatment at a temperature of 0° to 200° C. for a period of time ranging from 0.5 to 50 hours, or there may be performed mixing and heating at 50° to 300° C. for 1 minute to 48 hours in an organic solvent such as an inert hydrocarbon, an alcohol, an ether, a ketone or an ester followed by removal of the solvent. Furthermore, in the case of contacting the components (1) and (4) with each other, or in the case of contacting the component (4) with the contacted product of the components (1) and (2-3), or in the case of contacting the components (2-3) and (4) with each other, there may be performed a co-pulverization treatment at a temperature of 0° to 200° C. for a period of time ranging from 0.5 to 50 hours, or there may be performed mixing and heating at 50° to 300° C. for 5 minutes to 10 hours in the presence or absence of an inert solvent followed by removal of unreacted titanium compound and/or vanadium compound by washing with an inert solvent.

The method of reaction between the magnesium halide and the compound of the general formula $Me(OR)_nX_{z-n}$ is not specially limited. Both may be reacted by mixing and heating for 5 minutes to 10 hours at a temperature in the range of 20° to 400° C., preferably 50° to 300° C., in an organic solvent such as an inert hydrocarbon, an alcohol, an ether, a ketone or an ester. Alternatively, both may be reacted by a co-pulverization treatment.

The application of a co-pulverization treatment is particularly preferred in the present invention. The apparatus to be used for the co-pulverization treatment is not specially limited, but there usually is employed a ball mill, a vibration mill, a rod mill or an impact mill. Conditions for the co-pulverization treatment such as the co-pulverization temperature and time can be decided easily by those skilled in the art according to which co-pulverization system is adopted. Generally, the co-pulverization temperature is in the range of 0° to 200° C., preferably 20° to 100° C., and the co-pulverization time is in the range of 0.5 to 50 hours, preferably 1 to 30 hours. It goes without saying that the operation should be carried out in an inert gas atmosphere and that the moisture should be avoided as far as possible.

The reaction ratio of the magnesium halide to the compound of the general formula $Me(OR)_nX_{z-n}$ is in the range of 1:0.01 to 1:10, preferably 1:0.1 to 1:5, in terms of Mg:Me (mol ratio).

The amount of the component (2-3) to be used in the invention is in the range of 0.01 to 5 grams, preferably 0.1 to 2 grams, per gram of the component (1). As to the amount of the component (4), it is desirable to adjust so that the titanium and/or vanadium content of the resulting solid component is in the range of 0.5 to 20% by weight, with the range of 1 to 10% by weight being particularly preferred in order to attain a well-balanced activity per titanium and/or vanadium and that per solid.

The most preferable sequence and method of contacting the components (1), (2-3) and (4) in the present invention are as follows.

First, the component (2-3) which is the reaction product of the magnesium halide and the compound of the general formula $Me(OR)_nX_{z-n}$ and the component (1) are reacted with each other at 0°–300° C., preferably 10°–200° C. and most preferably 20°–100° C., for 1 minute to 48 hours, preferably 2 minutes to 10 hours, in a solvent which dissolves the component (2-3). Examples of the solvent includes alcohols, ethers, ketones and amines. Preferred examples of such solvent are methanol, ethanol, isopropanol, butanol, pentanol, hexanol, octanol, benzyl alcohol, methylcellosolve, ethylcellosolve, methyl formate, ethyl formate, methyl acetate, ethyl acetate, butyl acetate, vinyl acetate, methyl acrylate, methyl methacrylate, octyl butyrate, ethyl laurate, octyl laurate, methyl benzoate, ethyl benzoate, octyl para-hydroxybenzoate, dibutyl phthalate, dioctyl phthalate, dimethyl malonate, dimethyl maleate, diethyl maleate, dimethyl ether, diethyl ether, diisopropyl ether, dibutyl ether, diamyl ether, tetrahydrofuran, dioxane, anisole, acetone, methyl ethyl ketone, methyl isobutyl ketone, ethyl butyl ketone, dihexyl ketone, acetophenone, diphenyl ketone, cyclohexanone, diethyl amine, triethyl amine, tetramethylene diamine, aniline, N,N-dimethyl aniline and pyridine. Ethanol, tetrahydrofuran and ethyl acetate are more preferable. In this case, the components (1) and (2-3) are contacted with each other in such a ratio as 0.01 to 5 grams, preferably 0.1 to 2 grams, of the component (2-3) per gram of the component (1). After the reaction, the solvent is removed to obtain the reaction product of the components (1) and (2-3).

Then, the component (4), namely, the titanium compound and/or the vanadium compound, is mixed under heating with the above reaction product of the components (1) and (2-3) at a temperature of 20° to 300° C., preferably 50° to 150° C., for 5 minutes to 10 hours in the presence or absence of an inert solvent such as hexane or heptane to have the titanium compound and/or the vanadium compound supported on the reaction product of the components (1) and (2-3). In this case, the amount of the component (4) is adjusted so that the content of the titanium compound and/or the vanadium compound in the resulting solid component is in the range of 0.5 to 20%, preferably 1 to 10%, by weight. After the reaction, unreacted titanium compound and/or vanadium compound is removed by washing several times with a solvent inert to Ziegler catalysts, followed by evaporation under reduced pressure, to obtain a solid powder.

The resultant reaction product (hereinafter referred to simply as the component [I]) of the components (1), (2-3) and (4) is then reacted with the component (5) of the general formula $R''_nSi(OR)_mX_{4-m-n}$ to obtain the solid catalyst component of the present invention.

The method of reaction between the component [I] and the component (5) is not specially limited. Both components may be reacted together by the co-pulverization treatment; or in the presence or absence of an inert solvent at a temperature of 20° to 400° C., preferably 50° to 300° C. for 5 minutes to 20 hours.

The components [I] and (5) are reacted together in such a reaction ratio as 0.05 to 50 grams, preferably 0.1 to 30 grams, of the component (5) per 100 grams of the component [I].

In the case of reacting the component (4) with the reaction product of the components (1), (2), (3) and (5), the sequence and method of the reaction among the components (1), (2), (3) and (5) are not specially limited, but preferably the components (2) and (3), or the components (2) and (5), or the components (2), (3) and (5), are reacted together in advance.

More concretely, the reaction may be carried out by contacting the reaction product of the components (2) and (3) with the component (1) and then contacting the component (5) with the resulting product, or by contacting the reaction product of the components (2) and (5) with the component (1) and then contacting the component (3) with the resulting product, or by contacting the component (1) with the reaction product of the components (2), (3) and (5).

The contact between the components (2) and (3), between the components (2) and (5), or among the components (2), (3) and (5), may be carried out in an organic solvent such as an inert hydrocarbon, an alcohol, an ether, a ketone or an ester, but preferably it is carried out by the co-pulverization treatment.

The contacting of the component (1) with the reaction product of the components (2) and (3), with the reaction product of the components (2) and (5), or with the reaction product of the components (2), (3) and (5), may be carried out by the co-pulverization treatment, but preferably it is carried out in an organic solvent such as an inert hydrocarbon, an alcohol, an ether, a ketone or an ester at a temperature of 50° to 300° C. for 1 minute to 48 hours.

In case the component (5) is contacted with the product resulting from contact of the reaction product of the components (2) and (3) with the component (1), or in case the component (3) is contacted with the product resulting from contact of the reaction product of the components (2) and (5) with the component (1), reaction may be allowed to take place by the co-pulverization treatment, or in the presence or absence of an inert solvent.

As to contact ratio (mol ratio) among the components (1), (2), (3) and (5), component (1):component (2) is in the range of 1:0.01 to 1:5, preferably 1:0.1 to 1:2, component (2):component (3) is in the range of 1:0.01 to 1:10, preferably 1:0.1 to 1:5, and component (2):component (5) is in the range of 1:0.01 to 1:10, preferably 1:0.1 to 1:5.

The contacting of the component (4) with the reaction product of the components (1), (2), (3) and (5) may be carried out by the co-pulverization treatment, but preferably the component (4) is mixed with the reaction product of the components (1), (2), (3) and (5) in the presence or absence of an inert solvent such as hexane or heptane and reaction is allowed to take place at a temperature of 20° to 300° C. for 5 to 10 hours. The amount of the component (4) is adjusted so that its content in the resulting solid component is in the range of 0.5 to 20%, preferably 1 to 10%, by weight.

As the organometallic compound used in the present invention, there may be employed organometallic compounds of Group I-IV metals in the Periodic Table known as one component of Ziegler catalysts, with organoaluminum compounds and organozinc compounds being particularly preferred, for example, organoaluminum compounds of the general formulae $R_3Al$, $R_2AlX$, $RAlX_2$, $R_2AlOR$, $RAl(OR)X$ and $R_3Al_2X_3$ wherein R is an alkyl or aral group having 1 to 20 carbon atoms and may be alike or different and X is a halogen atom, and organozinc compounds of the general formula $R_2Zn$ wherein R is an alkyl group having 1 to 20 carbon atoms and may be alike or different, such as triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, ethylaluminum, sesquichloride, diethylzinc, and mixtures thereof. The amount of the organometallic compound is not specially limited, but usually the organometallic compound may be used in an amount of 0.1 to 1,000 mols per mol of the titanium compound and/or the vanadium compound.

It is also preferable in the present invention to use the organometallic compound component as a mixture or addition compound of the organometallic compound as enumerated above and an organic acid ester.

In case the organometallic compound and the organic acid ester are used as a mixture, the organic acid ester is used usually in an amount of 0.1 to 1 mol, preferably 0.2 to 0.5 mol, per mol of the organometallic compound. In case the organometallic compound and the organic acid ester are used as an addition compound, the ratio of the organometallic compound to the organic acid ester is preferably in the range of 2:1 to 1:2 in terms of molar ratio.

The organic acid ester is an ester of a saturated or unsaturated mono- or dibasic organic carboxylic acid having 1 to 24 carbon atoms with an alcohol having 1 to 30 carbon atoms. Examples of such organic acid ester are methyl formate, ethyl acetate, amyl acetate, phenyl acetate, octyl acetate, methyl methacrylate, ethyl stearate, methyl benzoate, ethyl benzoate, n-propyl benzoate, isopropyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinate, methyl anisate, ethyl anisate, phenyl anisate, benzyl anisate, ethyl o-methoxybenzoate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate. Particularly preferred are alkyl esters, especially methyl and ethyl esters, of benzoic acid, o- or p-toluic acid and p-anisic acid.

The olefin polymerization using the catalyst of the invention may be carried out in the form of a slurry polymerization, a solution polymerization or a vapor phase polymerization. Particularly, the catalyst of the present invention is suitable for the vapor phase polymerization. The polymerization reaction is carried out in the same manner as in the conventional olefin polymerization reaction using a Ziegler type catalyst; that is, the reaction is performed in a substantially oxygen- and water-free condition and in the presence or absence of an inert hydrocarbon. Conditions for the olefin polymerization involve temperatures ranging from 20° to 120° C., preferably from 50° to 100° C., and pressures ranging from atmospheric pressure to 70 kg/cm², preferably from 2 to 60 kg/cm². Adjustment of the molecular weight can be made to a certain extent by changing polymerization conditions such as the polymerization temperature and the catalyst mol ratio, but the addition of hydrogen into the polymerization system is more effective for this purpose. Of course, two or more stage polymerization reactions having different polymerization conditions such as different hydrogen concentrations and different polymerization temperatures can be performed without any trouble by using the catalyst of the present invention.

The present invention is applicable to the polymerization of all olefins that are polymerizable with Ziegler catalysts, preferably α-olefins having 2 to 12 carbon atoms. For example, the present invention is suitable for the homopolymerization of such α-olefins as ethylene, propylene, 1-butene, hexene-1 and 4-methylpentene-1, the copolymerization of ethylene and propylene, ethylene and 1-butene, ethylene and hexene-1, propylene and 1-butene, and the copolymerization of ethylene with two or more other α-olefins.

Copolymerization with dienes for the modification of polyolefins is also preferable. Examples of diene compounds used in this copolymerization are butadiene, 1,4-hexadiene, ethylidene norbornene and dicyclopentadiene.

By using the catalyst of the present invention there is obtained in high activity a polyolefin having a large average particle size, a narrow particle size distribution and a decreased proportion of fine particles, and the bulk density of the polyolefin is high, which is very advantageous to the polymerizing operation. The polyolefin thus obtained can be subjected to molding not only as pellets but also directly as powder while causing little trouble in the molding operation. Thus, polyolefins can be prepared very advantageously.

The polymer obtained by using the catalyst of the present invention is further characteristic in that the molecular weight distribution is very narrow and that the smaller the hexane extraction, the smaller the by-production of low grade polymer. Therefore, if the polyolefin having a narrow molecular weight distribution obtained by using the catalyst of the present invention is used for the formation of a film, the resulting film will have many merits, for example, high strength, high transparency, and superior anti-blocking and heat-sealing properties.

The present invention provides a novel catalyst system which exhibits many such characteristic features and which overcomes the foregoing drawbacks associated with the prior art. It is quite surprising that the above-mentioned advantages can be attained easily by using the catalyst of the present invention.

The following examples are illustrative of the present invention and are not intended to limit the invention in any manner.

EXAMPLE 1

(a) Preparation of a Solid Catalyst Component 10 g. of a commercially available anhydrous magnesium chloride and 4.2 g. of aluminum triethoxide were placed in a stainless steel pot having a content volume of 400 ml. and containing 25 stainless steel balls each ½ inch in diameter, and ball milling was made for 16 hours at room temperature under a nitrogen atmosphere to obtain a reaction product. Then, a three-necked flask equipped with a stirrer and a reflux condenser was purged with nitrogen, into which were charged 5 g. of the above reaction product and 5 g. of $SiO_2$ (Fuji-Davison, #952) which had been calcined at 600° C., then 100 ml. of tetrahydrofuran was added and reaction was allowed to take place at 60° C. for 2 hours, followed by drying at 120° C. under reduced pressure to remove tetrahydrofuran. Then, after adding 50 cc. of hexane and subsequent stirring, 1.1 ml. of titanium tetrachloride was added and reaction was allowed to proceed for 2 hours under reflux of hexane to obtain a solid power (A) which contained 40 mg. of titanium per gram thereof.

The solid powder (A) was added into 50 ml. of hexane, then 1 ml. of tetraethoxysilane was added and reaction was allowed to take place for 2 hours under reflux of hexane to obtain a solid catalyst component.

(b) Vapor Phase Polymerization

A stainless steel autoclave was used as a vapor phase polymerization apparatus, and a loop was formed by a blower, a flow control device and a dry cyclone. The temperature of the autoclave was adjusted by passing a warm water through a jacket.

Into the autoclave held at 80° C. were charged the above solid catalyst component and triethylaluminum at rates of 250 mg/hr and 50 mmol/hr, respectively, and butene-1, 1ethylene and hydrogen were fed while adjusting so that the butene-1/ethylene ratio (mol raio) in the vapor phase within the autoclave was 0.27 and the hydrogen concentration was 17% of the total pressure, and polymerization was made while recycling the intrasystem gases by the blower. The resulting ethylene copolymer was a powder having an average particle size of 750μ not containing particles below 150μ and having a bulk density of 0.42, a melt index (MI) of 1.0 and a density of 0.9208. The catalyst activity was 100,000 g.copolymer/g.Ti.

F.R. value (F.R. = $MI_{2.16}/MI_{10}$) represented in terms of the ratio of a melt index (MI) of the copolymer of 2.16 determined at a load of 2.16 kg. to a melt index (MI) thereof of 10 at a load of 10 kg. both at 190° C. according to the method of ASTM-D1238-65T was 7.2 and thus the molecular weight distribution was very narrow.

A film was formed from this copolymer and it was extracted in boiling hexane for 10 hours; as a result, the extraction proved to be 0.8 wt.% and thus the amount of the extract was very small.

COMPARATIVE EXAMPLE 1

The following vapor phase polymerization was carried out using the apparatus described in Example 1.

The autoclave held at 80° C. was charged with the solid powder (A) obtained in Example 1 and triethylaluminum at rates of 250 mg/hr and 50 mmol/hr, respectively, and butene-1, ethylene and hydrogen gases were fed therein while adjusting so that the butene-1/ethylene ratio (mol ratio) in the vapor phase within the autoclave was 0.25 and the hydrogen concentration was 15% of the total pressure, and polymerization was carried out at total pressure of 10 kg/cm² while recycling the intrasystem gases by the blower. The resulting ethylene copolymer was a powder having an average particle size of 700μ not containing particles below 150μ and having a bulk density of 0.41, a melt index (MI) of 1.2 and a density of 0.9210. The catalyst activity was 112,000 g.copolymer/g.Ti.

The F.R. value of this copolymer was 7.6 and thus the molecular weight distribution was wider than that in Example 1.

A film was formed from this copolymer and it was extracted in boiling hexane for 10 hours; as a result, the hexane extraction proved to be 1.1 wt.%.

EXAMPLE 2

(a) Preparation of a Solid Catalyst Component 10 g. of an anhydrous magnesium chloride and 4.2 g. of tetraethoxysilane were placed in the ball milling pot described in Example 1, and ball milled for 16 hours at room teperature under a nitrogen atmosphere to obtain a reaction product. Then, 5 g. of the reaction product and 5 g. of $SiO_2$ which had been calcined at 600° C. were placed in the three-necked flask described in Example 1, thereafter 100 ml. of tetrahydrofuran was added and reaction was allowed to take place at 60° C. for 2 hours, followed by drying at 120° C. under reduced pressure to remove tetrahydrofuran. Then, after adding 50 cc. of hexane and subsequent stirring, 1.1 ml. of titanium tetrachloride was added and reaction was allowed to proceed for 2 hours under reflux of hexane to obtain a solid powder (B) which contained 40 mg. of titanium per gram of the solid powder (B).

The solid powder (B) was added into 50 ml. of hexane, then 1 ml. of tetraethoxysilane was added and reaction was allowed to take place for 2 hours under reflux of hexane to obtain a solid catalyst component.

(b) Vapor Phase Polymerization

The following vapor phase polymerization was carried out using the apparatus described in Example 1.

The autoclave held at 80° C. was charged with the above solid catalyst component and triethylaluminum at rates of 250 mg/hr and 50 mmol/hr, respectively, and butene-1, ethylene and hydrogen gases were fed therein while adjusting so that the butene-1/ethylene ratio (mol ratio) in the vapor phase within the autoclave was 0.28 and the hydrogen concentration was 17% of the total pressure, and polymerization was carried out while recycling the intrasystem gases by the blower. The resulting ethylene copolymer was a powder having an average particle size of 750μ not containing particles below 150μ and having a bulk density of 0.38, a melt index (MI) of 1.1 and a density of 0.9250. The catalyst activity was 100,000 g.copolymer/g.Ti.

The F.R. value of the copolymer was 7.2. When a film was formed from this copolymer and it was extracted in boiling hexane for 10 hours, the hexane extraction was found to be 0.8 wt.%.

COMPARATIVE EXAMPLE 2

The following vapor phase polymerization was carried out using the apparatus described in Example 1.

The autoclave held at 80° C. was charged with the solid powder (B) obtained in Example 2 and tirethylaluminum at rates of 250 mg/hr and 50 mmol/hr, respectively, and butene-1, ethylene and hydrogen gases were fed therein while adjusting so that the butene-1/ethylene ratio (mol ratio) in the vapor phase within the autoclave was 0.28 and the hydrogen concentration was 15% of the total pressure, and polymerization was carried out at a total pressure of 10 kg/cm² while recycling the intrasystem gases by the blower. The resulting ethylene copolymer was a powder having an average particle size of 750μ not containing particles below 150μ and having a bulk density of 0.38, a melt index (MI) of 1.0 and a density of 0.9180. The catalyst activity was 120,000 g.copolymer/g.Ti.

The F.R. value of the copolymer was 8.0 and thus the molecular weight distribution was wider than that in Example 2.

A film was formed from this copolymer and it was extracted in boiling hexane for 10 hours; as a result, the hexane extraction was 2.0 wt.%.

EXAMPLE 3

(a) Preparation of a Solid Catalyst Component 10 g. of an anhydrous magnesium chloride and 4.2 g. of aluminum triethoxide were placed in the ball milling pot described in Example 1 and the ball milled for 16 hours at room temperature under a nitrogen atmosphere to obtain a reaction product. 5 g. of the reaction product and 5 g. of SiO₂ which had been calcined at 600° C. were put into the three-necked flask described in Example 1, then 100 ml. of ethyl acetate was added, and reaction was allowed to take place at 60° C. for 2 hours, followed by drying at 120° C. under reduced pressure to remove ethyl acetate. Then, after adding 50 cc. of hexane and subsequent stirring, 1.1 ml. of titanium tetrachloride was added and reaction was allowed to proceed for 2 hours to obtain a solid powder (C) which contained 40 mg. of titanium per gram thereof.

The solid powder (C) was added into 50 ml. of hexane, then 0.5 ml. of tetraethoxysilane was added and reaction was allowed to take place for 3 hours under reflux of hexane to obtain a solid catalyst component.

(b) Vapor Phase Polymerization

The following vapor phase polymerization was carried out using the apparatus described in Example 1.

The autoclave held at 80° C. was charged with the above solid catalyst component and triethylaluminum at rates of 250 mg/hr and 50 mmol/hr, respectively, and butene-1, ethylene and hydrogen gases were fed therein while adjusting to give a butene-1/ethylene ratio (mol ratio) in the vapor phase within the autoclave of 0.27 and a hydrogen concentration of 17% of the total pressure, and polymerization was carried out while recycling the intrasystem gases by the blower. The resulting ethylene copolymer was a powder having an average particle size of 600μ not containing particles below 150μ and having a bulk density of 0.39, a melt index (MI) of 1.5 and a density of 0.9200. The catalyst activity was 90,000 g.copolymer/g.Ti.

The F.R. value of the copolymer was 7.5. A film was formed from this copolymer and it was extracted in boiling hexane for 10 hours; as a result, the hexane extraction was 0.9 wt.%.

EXAMPLE 4

(a) Preparation of a Solid Catalyst Component 10 g. of an ahydrous magnesium chloride and 4.1 g. of triethoxyboron was placed in the ball milling pot described in Example 1 and ball milled for 16 hours at room temperature under a nitrogen atmosphere to obtain a reaction product. 5 g. of the reaction product and 5 g. of SiO₂ which had been calcined at 600° C. were put into the three-necked flask described in Example 1, then 100 ml. of tetrahydrofuran was added and reaction was allowed to take place at 60° C. for 2 hours, followed by drying at 120° C. under reduced pressure to remove tetrahydrofuran. Then, after adding 50 cc. of hexane and subsequent stirring, 1.1 ml. of titanium tetrachloride was added and reaction was allowed to proceed for 2 hours under reflux of hexane to obtain a solid power (D) which proved to contain 40 mg. of titanium per gram thereof.

The solid powder (D) was added into 50 ml. of hexane, then 1 ml. of tetrasilane was added and reaction was allowed to take place for 2 hours under reflux of hexane to obtain a solid catalyst component.

(b) Vapor Phase Polymerization

The following vapor phase polymerization was carried out using the apparatus described in Example 1.

The above solid catalyst component and triethylaluminum were fed into the autoclave held at 80° C. at rates of 250 mg/hr and 50 mmol/hr, respectively, and butene-1, ethylene and hydrogen gases were introduced while adjusting to give a butene-1/ethylene ratio (mol ratio) in the vapor phase within the autoclave of 0.27 and a hydrogen concentration of 17% of the total pressure, and polymerization was carried out while recycling the intrasystem gases by the blower. The resulting ethylene copolymer was a powder having an average particle size of 500μ not containing particles below 44μ and having a bulk density of 0.42, a melt index (MI) of 1.3 and a density of 0.9205. the catalyst activity was 70,000 g.copolymer/g.Ti.

The F.R. value of the copolymer was 7.4. A film was formed from this copolymer and it was extracted in boiling hexane for 10 hours; as a result, the hexane extraction was 0.9 wt.%.

EXAMPLE 5

(a) Preparation of a Solid Catalyst Component 10 g. of an anhydrous magnesium chloride and 4.2 g. of diethoxymagnesium were placed in the ball milling pot described in Example 1 and ball milled for 16 hours at room temperature under a nitrogen atmosphere to obtain a reaction product. 5 g. of the reaction product and 5 g. of SiO₂ which had been calcined at 600° C. were put into the three-necked flask described in Example 1, then 100 ml. of tetrahydrofuran was added and reaction was allowed to take place at 60° C. for 2 hours, followed by drying at 120° C. under reduced pressure to remove tetrahydrofuran. Then, after adding 50 cc. of hexane and subsequent stirring, 1.1 ml. of titanium tetrachloride was added and reaction was allowed to proceed for 2 hours under reflux of hexane to obtain a solid powder (E) which proved to contain 40 mg. of titanium per gram thereof.

The solid powder (E) was added into 50 ml. of hexane, then 1 ml. of tetraethoxysilane was added and reaction was allowed to take place for 2 hours under reflux of hexane to obtain a solid catalyst component.

(b) Vapor Phase Polymerization

The following vapor phase polymerization was carried out using the apparatus described in Example 1.

The above solid catalyst component and triethylaluminum were fed into the autoclave held at 80° C. at rates of 250 mg/hr and 50 mmol/hr, respectively, and butene-1, ethylene and hydrogen gases were introduced while adjusting to give a butene-1/ethylene ratio (mol ratio) in the vapor phase within the autoclave of 0.27 and a hydrogen concentration of 17% of the total pressure, and polymerization was carried out while recycling the intrasystem gases by the blower. The resulting ethylene copolymer was a powder having an average particle size of 600μ not containing particles below 100μ and having a bulk density of 0.40, a melt index (MI) of 0.5 and a density of 0.9250. The catalyst activity was 100,000 g.copolymer/g.Ti.

The F.R. value of the copolymer was 7.5. A film was formed from this copolymer and it was extracted in boiling hexane for 10 hours; as a result, the hexane extraction was 0.4 wt.%.

EXAMPLE 6

(a) Preparation of a Solid Catalyst Component 10 g. of a commercially available anhydrous magnesium chloride and 4.2 g. of aluminum triethoxide were placed in a stainless steel pot having a content volume of 400 ml. and containing 25 stainless steel balls each ½ inch in diameter and balled milled for 16 hours at room temperature under a nitrogen atmosphere to obtain a reaction product. Then, a three-necked flask equipped with a stirrer and a reflux condenser was purged with nitrogen, into which were charged 5 g. of the above reaction product and 5 g. of SiO₂ (Fuji-Davison, #952) which had been calcined at 600° C., then 100 ml. of tetrahydrofuran was added and reaction was allowed to take place at 60° C. for 2 hours, followed by drying at 120° C. under reduced pessure to remove tetrahydrofuran. Then, 50 cc. of hexane and 2 ml. of tetraethoxysilane were added and reaction was allowed to take place at 50° C. for 2 hours, thereafter 1.1 ml. of titanium tetrachloride was added and reaction was made for 2 hours under reflux of hexane to obtain a solid catalyst component which proved to contain 38 mg. of titanium per gram thereof.

(b) Vapor Phase Polymerization

A vapor phase polymerization was carried out in the following manner using the apparatus described in Example 1.

The above solid catalyst component and triethylaluminum were fed into the autoclave held at 80° C. at rates of 250 mg/hr and 50 mmol/hr, respectively, and butene-1, ethylene and hydrogen gases were introduced while adjusting to give a butene-1/ethylene ratio (mol ratio) in the vapor phase within the autoclave of 0.28 and a hydrogen concentration of 1% of the total pressure, and polymerization was carried out while recycling the intrasystem gases by the blower. The resulting ethylene copolymer was a powder having an average particle size of 730μ not containing particles below 150μ and having a bulk density of 0.40, a melt index (MI) of 1.0 and a density of 0.9221. The catalyst activity was 135,000 g.copolymer/g.Ti.

The F.R. value of the copolymer was 7.2. A film was formed from this copolymer and it was extracted in boiling hexane for 10 hours; as a result, the hexane extraction was 0.9 wt.%.

EXAMPLE 7

(a) Preparation of a Solid Catalyst Component 10 g. of a commercially available anhydrous magnesium chloride, 4.2 g. of aluminum triethoxide and 3 g. of monomethyltriethoxysilane were placed in a stainless steel pot having a content volume of 400 ml. and containing 25 stainless steel balls each ½ inch in diameter and ball milled for 16 hours at room temperature under a nitrogen atmosphere to obtain a reaction product. Then, a three-necked flask equipped with a stirrer and a reflux condenser was purged with nitrogen, into which were charged 5 g. of the above reaction product and 5 g. of SiO₂ (Fuji-Davison, #952) which had been calcined at 600° C., then 100 ml. of tetrahydrofuran was added and reaction was allowed to take place at 60° C. for 2 hours, followed by drying at 120° C. under reduced pressure to remove tetrahydrofuran. Then, after adding 50 cc. of hexane and subsequent stirring, 1.1 ml. of titanium tetrachloride was added and reaction was made for 2 hours under reflux of hexane to obtain a solid powder (A) which proved to contain 40 mg. of titanium per gram thereof.

(b) Vapor Phase Polymerization

A stainless steel autoclave was used as a vapor phase polymerization apparatus, and a loop was formed by a blower, a flow control device and a dry cyclone. The temperature of the autoclave was adjusted by passing a warm water through a jacket.

The above solid catalyst component and triethylaluminum were fed into the autoclave held at 80° C. at rates of 250 mg/hr and 50 mmol/hr, respectively, and butene-1, ethylene and hydrogen gases were introduced while adjusting to give a butene-1/ethylene ratio (mol ratio) in the vapor phase within the autoclave of 0.27 and a hydrogen concentration of 17% of the total pressure, and polymerization was carried out while recycling the intrasystem gases by the blower. The resulting ethylene copolymer was a powder having an average particle size of $710\mu$ not containing particles below $150\mu$ and having a bulk density of 0.40, a melt index (MI) of 0.8 and a density of 0.9210. The catalyst activity was 130,000 g.copolymer/g.Ti.

The F.R. value was 7.1. A film was formed from this copolymer and it was extracted in boiling hexane for 10 hours; as a result, the hexane extraction was 0.8 wt.%.

What is claimed is:

1. In an olefin polymerizing catalyst comprising a solid catalyst component and an organometallic compound, the improvement wherein said solid catalyst component is a substrate obtained by contacting and reacting the following compounds with one another:
   (1) at least one member selected from the group consisting of a silicon oxide and an aluminum oxide,
   (2) a magnesium halide,
   (3) a compound represented by the general formula $Me(OR)_nX_{z-n}$ where Me is an element belonging to Groups I through IV in the Periodic Table, z is the valence of the element Me, n is $0 < n \leq z$, X is a halogen atom and R is a hydrocarbon radical having 1 to 20 carbon atoms,
   (4) at least one member selected from the group consisting of a titanium compound and a vanadium compound, and
   (5) at least one member selected from the group consisting of a compound represented by the general formula $R''_nSi(OR')_mX_{4-m-n}$ where R' and R'' are each a hydrocarbon radical having 1 to 24 carbon atoms, X is a halogen atom, n is $0 \leq n < 4$ and m is $0 < m \leq 4$, with the limitation that $0 < m+n \leq 4$, and a polysiloxane.

2. The catalyst of claim 1 wherein said silicon oxide is silica.

3. The catalyst of claim 1 wherein said aluminum oxide is alumina.

4. The catalyst of claim 1 wherein said magnesium halide is magnesium chloride.

5. The catalyst of claim 1 wherein said Me is Na, Mg, Ca, Zn, Cd, B, or Al.

6. The catalyst of claim 1 wherein said titanium compound is a tetravalent titanium compound represented by the general formula $Ti(OR)_nX_{4-n}$ where R is an alkyl, aryl or aralkyl group having 1 to 20 carbon atoms, X is a halogen atom and n is $0 \leq n \leq 4$, or a trivalent titanium compound obtained by reducing said tetravalent titanium compound.

7. The catalyst of claim 1 wherein said solid catalyst component is obtained by reacting said components (2) and (3) with each other in advance and contacting and reacting said components (1), (4) and (5) with the resulting reaction product in a desired sequence.

8. The catalyst of claim 1 wherein the ratio of said component (1) to said component (2) is in the range of 1:0.01 to 1:5.

9. The catalyst of claim 1 wherein the ratio of said component (2) to said component (3) is in the range of 1:0.01 to 1:10.

10. The catalyst of claim 1 wherein the ratio of said component (2) to said component (5) is in the range of 1:0.01 to 1:10.

* * * * *